Nov. 21, 1967 — R. JÖRN — 3,353,879

SLEEVE BEARING

Filed Aug. 3, 1965

Inventor:
Raoul Jörn
by Michael S. Striker
Attorney

Inventor:
Raoul Jörn
by Michael S. Striker
Attorney

United States Patent Office 3,353,879
Patented Nov. 21, 1967

3,353,879
SLEEVE BEARING
Raoul Jörn, Lindau (Bodensee), Germany, assignor to
Metzeler A.G., Munich, Germany
Filed Aug. 3, 1965, Ser. No. 476,845
Claims priority, application Germany, Aug. 4, 1964,
M 61,983
8 Claims. (Cl. 308—26)

ABSTRACT OF THE DISCLOSURE

A sleeve bearing having an inner sleeve of elastically deformable material having an inner substantially cylindrical surface and being formed with a plurality of corrugations extending in axial direction through the length of the sleeve, spaced in circumferential direction from each other and forming axial extending expansion grooves, an outer sleeve of elastically compressible material surrounding the inner sleeve and tightly engaging the outer surface of the latter, and a carrying member formed with a bore therethrough having a smaller diameter than the outer diameter of the outer sleeve in unstressed condition and receiving the outer sleeve in the aforementioned bore so that the outer sleeve is tightly held therein in radially compressed condition.

---

The present invention relates to sleeve bearings, and more specifically to sleeve bearings of plastic material and constructed to take up radial and axial forces of a shaft turnably or oscillatingly mounted therein.

Sleeve bearings are known which include an inner sleeve of plastic material and an outer sleeve of rubber material surrounding the inner sleeve and vulcanized to the outer surface of the latter. Sleeve bearings of this type are pressed in a bore of a carrying member in such a manner that the outer rubber sleeve is radially compressed, whereby the sleeve bearing is held in the bore of the carrying member. A steel shaft is turnably mounted in the inner sleeve of the aforementioned bearing. Known plastic materials which are suitable for sleeve bearings of the aforementioned kind have a substantially greater coefficient of thermal expansion than steel. In addition, these known plastic materials will absorb humidity from the surrounding atmosphere, that is the plastic material will tend to assume a moisture content which is equal to the moisture content of the surrounding atmosphere. The increase or decrease of the moisture content of the plastic material will result in a change of volume of the sleeve of plastic material in addition to the change produced by the heat expansion or contraction thereof. This change of volume of the plastic sleeve of the sleeve bearing, due to heat expansion and contraction and due to the hygroscopic characteristics of the plastic material, can lead to such a change of the inner diameter of the plastic sleeve so that, during increase of the volume, the running clearance between the inner surface of the plastic sleeve and the outer surface of the shaft mounted therein is reduced to an extent to tightly clamp the shaft in the sleeve, whereas during reduction of the volume of the plastic sleeve, the running clearance will be increased to such an extent that the shaft is not properly guided any longer in the sleeve.

In an attempt to overcome this disadvantage of plastic sleeve bearings of the type mentioned, sleeve bearings of this type have been constructed in which the inner sleeve is slotted in axial direction. Such slotted inner plastic sleeves however have the disadvantage that the stresses imparted thereto by the compressed outer sleeve will be unequally distributed over the circumference of the slotted sleeve. This in turn will result in that the inner surface of the plastic sleeve will get out of round, and in addition thereto, the slot in the inner sleeve will detrimentally affect proper compression of the outer rubber sleeve in the bore of the carrying member and the resulting radial pretensioning of the latter necessary to produce the necessary friction between the sleeve bearing and the carrying member.

It is an object of the present invention to overcome the disadvantages of sleeve bearings of the aforementioned kind known in the art.

It is an additional object of the present invention to provide a sleeve bearing of the aforementioned kind in which a proper running clearance will be maintained between the inner surface of the inner sleeve and the shaft mounted therein regardless of change of the volume of the inner sleeve due to heat expansion or contraction and/or change of the moisture content thereof.

It is a further object of the present invention to provide a sleeve bearing of the aforementioned kind which is composed of relatively few and simple parts so that a sleeve bearing can be manufactured at very reasonable cost and will stand up properly under extended use.

With these objects in view, the sleeve bearing according to the present invention mainly comprises an inner sleeve member of plastically deformable material having an inner substantially cylindrical surface and being formed with a plurality of corrugations extending in axial direction through the length thereof spaced in circumferential direction thereof from each other and forming a plurality of axially extending expansion grooves, an outer sleeve of elastically compressible material surrounding the inner sleeve and fixedly connected to the outer surface of the latter, said outer sleeve having in unstressed condition a given outer diameter, and a carrying member formed with a bore therethrough of a diameter smaller than the given diameter of the outer sleeve in unstressed condition so that the outer sleeve when received in the bore is tightly held therein in radially compressed condition.

The inner sleeve is preferably formed from plastic material, whereas the outer sleeve is preferably formed from rubber and the corrugations in the inner sleeve are arranged in such a manner that the grooves defined thereby open towards the inner surface of the inner sleeve.

The sleeve bearing of the present invention may be constructed for taking up radial as well as axial forces of a shaft turnably or oscillatably mounted therein and in such an arrangement the inner sleeve member has a cylindrical portion and a radially outwardly extending annular flange portion at one end thereof, whereas the outer sleeve has a cylindrical portion surrounding the cylindrical portion of the inner sleeve fixedly connected to the outer surface of the latter and radially outwardly extending annular flange portion abutting with one end surface thereof against the corresponding surface of flange portions of the inner sleeve. In this arrangement the corrugations are formed in the cylindrical portion of the inner sleeve and the annular flange portion thereof is preferably formed with a plurality of cutouts respectively located in the region of the aforementioned corrugations in the cylindrical portion. Each of the cutouts extends in substantially radial direction from the inner periphery of the flange portion toward, but short of, the outer periphery thereof so as to leave at the outer end of each cutout a web of small width, connecting the segments formed from the flange portions by the cutouts. Preferably, each of these webs has a substantially U-shaped configuration permitting an easy flexing thereof and thereby movement of the aforementioned segments in radial direction.

Changes of volume in the inner sleeve due to heat expansion or contraction and/or reduction or increase of the moisture content thereof will be taken up by the corrugations so that the inner diameter of the inner sleeve will not be substantially changed during such change of the volume thereof. The outer rubber sleeve will assure in this construction a uniform radial pretensioning of the segments of the inner sleeve to hold thereby the inner diameter of the latter substantially constant. Therefore, the running clearance between the inner sleeve and the shaft mounted therein will remain substantially constant and independent of the influence of any change in temperature and/or humidity of the surrounding atmosphere.

The described arrangement has the additional advantage that the grooves formed by the corrugations in the inner sleeve and by the cutouts in the annular flange portion thereof can be used as reservoirs for lubricating means which will further improve the running quality of a shaft mounted in the sleeve bearing according to the present invention.

In addition, the outer rubber sleeve may also be formed in the region of the corrugations formed in the cylindrical portion of the inner sleeve with axially extending grooves or cutouts. Such an arrangement is especially advantageous when an easy radial yieldability of the inner sleeve is desired and such an arrangement will also provide for a proper sound insulation.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is an axial cross section through a sleeve bearing according to the prior art, including an inner plastic sleeve having a cylindrical portion and at one end thereof a radially outwardly extending flange portion, and a rubber sleeve surrounding the inner plastic sleeve and mounted in the bore of a carrying member, in which the cylindrical portion and the flange portion of the inner sleeve is slotted;

Figure 1:
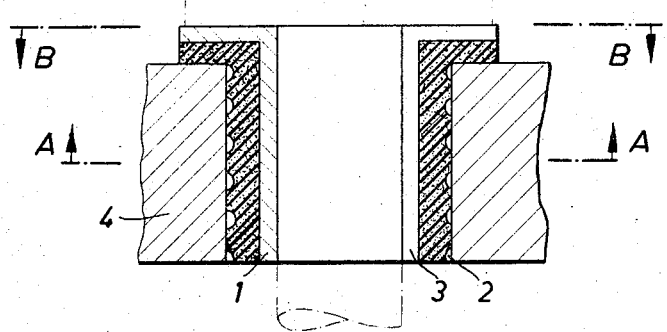
Figure 2:
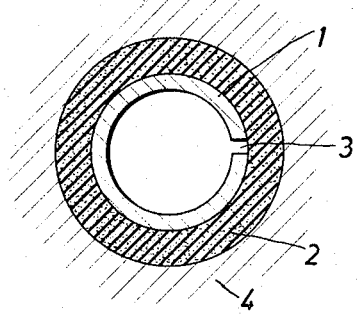
FIG. 2 is a cross section taken along the line A—A of FIG. 1.
Figure 3:
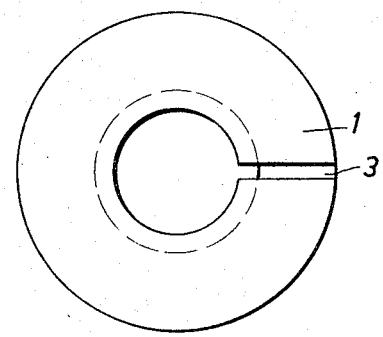
FIG. 3 is an end view of the arrangement shown in FIG. 1 viewed in the direction of the arrows B—B.

FIGS. 1–3 illustrate a sleeve bearing of plastic material according to the prior art for taking up radial and axial forces of a shaft turnably mounted therein. As shown in the FIGS. 1–3, the sleeve bearing comprises an inner sleeve 1 having a cylindrical portion and a radially outwardly extending flange portion at one end thereof which is formed from plastic material and this inner sleeve 1 is formed throughout the length thereof with an axially extending slot 3 which extends also in axial direction through the flange portion of the inner sleeve. This slot 3 is adapted to take up the variations occurring in the inner sleeve 1 due to changes in the temperature and humidity of the surrounding atmosphere. The inner sleeve 1 is surrounded by an outer rubber sleeve 2 which in turn is pressed into a bore in a carrying member 4 so that the rubber sleeve 2 in the inner sleeve 1 of plastic material is tightly held in the bore due to the radial stressing thereof by press fitting the same into the bore.

Figure 4:
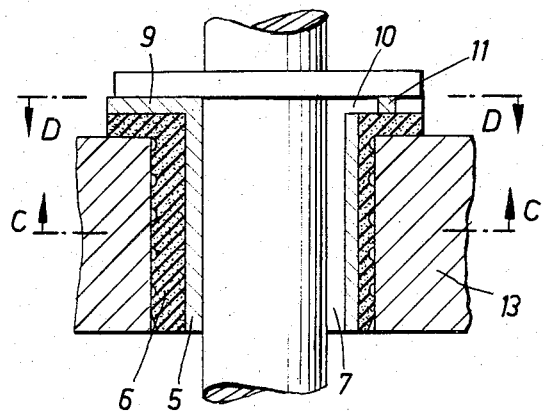
FIG. 4 is an axial cross section through a sleeve bearing according to the present invention.
Figure 5:
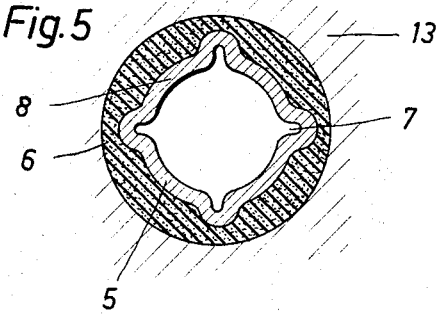
FIG. 5 is a cross section of FIG. 4 taken along the line C—C and viewed in the direction of the arrows.
Figure 8:
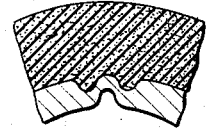
Figure 6:
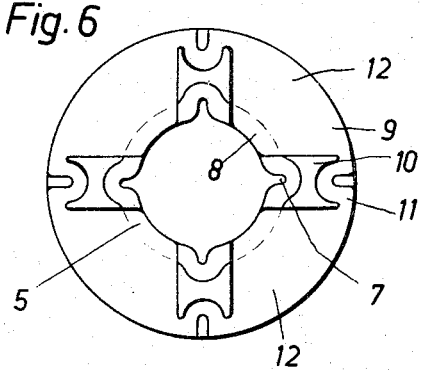
FIG. 6 is an end view of the embodiment shown in FIG. 4 and viewed in the direction of the arrows D—D.

FIGS. 4–6 illustrate an embodiment of a sleeve bearing adapted to take up radial and axial forces of a shaft mounted therein, which sleeve bearing is constructed according to the present invention. As can be seen from these figures, the sleeve bearing according to the present invention comprises an inner sleeve formed from plastic material and having a substantially cylindrical portion 5 and a flange portion 9 extending in radially outward direction from one end of the cylindrical portion 5. The cylindrical portion 5 of the inner sleeve is formed with a plurality of corrugations 7 extending in axial directions throughout the length of the cylindrical portion 5 of the inner sleeve spaced in circumferential direction from each other and forming axially extending expansion grooves open towards the inner surface of the inner sleeve 5. These expansion grooves or corrugations 7 will take up any expansion or contraction produced in the inner sleeve 5 respectively in the segments 8 of the inner sleeve intermediate the corrugations 7, which are produced by the influence of temperature and humidity changes in the atmosphere surrounding the sleeve bearing. The flange portion 9 of the inner sleeve is formed, in the region of the corrugations 7 in the cylindrical portion 5, with a plurality of cutouts 10 respectively extending in substantially radial direction from the inner periphery of the flange 9 toward, but short of, the outer periphery thereof, so as to leave at the outer end of each cutout 10 a web portion 11 of small width connecting the segments 12 formed from the flange portion 9 by the cutouts 10. Each of the cutouts 10 has preferably a pair of lateral portions extending deeper in the web than a central portion of the cutout and each web is formed midway between the lateral portions with a groove extending from the outer periphery thereof partly through the web so as to form a web of substantially U-shaped configuration providing an expansion groove permitting the segments 12 connected by the U-shaped webs to expand and contract. The cylindrical portion 5 of the inner sleeve is surrounded by an outer sleeve 6 formed of rubber or similar compressible material which engages with its inner surface the outer surface of the cylindrical portion 5 of the inner sleeve, and which has likewise at one end thereof a radially outwardly extending flange portion abutting with its top face against the bottom face of the flange portion 9 of the inner sleeve. The outer rubber sleeve 6 has in unstressed condition a piven outer diameter and the outer sleeve 6 is pressed into a bore of a carrying member 13 having a diameter slightly smaller than the given outer diameter of the rubber sleeve 6 in unstressed condition so that during press fitting of the latter into the bore, the rubber sleeve 6 and the cylindrical portion 5 of the inner sleeve is prestressed and held thereby tightly in the bore of the carrying member 13.

The diameter of the bore in the carrying member 13 and the outer diameter of the rubber sleeve 6 in unstressed condition is dimensioned in such a manner that after press fitting the rubber sleeve 6 into the bore of the carrying member 13 the prestressing produced in the cylindrical portion 5 of the inner sleeve will result in a proper running clearance for a shaft mounted therein. This running clearance will not be changed when the sleeve bearing of the present invention is subjected to changes in the temperature and humidity of the surrounding atmosphere, since the variations in the volume of the inner sleeve 5 resulting therefrom will be taken up by the corrugations or expansion grooves formed in the inner sleeve.

Figure 7:
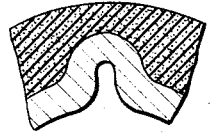
FIGS. 7–10 are partial cross sectional views similar to FIG. 5 drawn to an enlarged scale and showing various modifications of the corrugations formed in the inner sleeve.
Figure 9:
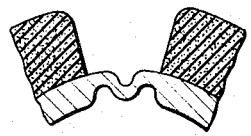
Figure 10:
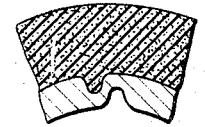

FIGS. 7–10 illustrate various modifications of the expansion grooves or corrugations according to the present invention, as well as the outer rubber sleeve surrounding the inner sleeve formed from plastic material. FIG. 7 shows a construction in which the wall thickness of the corrugation forming the expansion groove is the same as in the remainder of the cylindrical portion 5 of the inner sleeve, whereas in the embodiments illustrated in FIGS. 8–10 the wall thickness of the portion of the inner sleeve forming the expansion grooves or corrugations 7 is smaller than in the remainder of the cylindrical portion.

of the inner sleeve. FIG. 9 especially shows a variation in which the outer rubber sleeve 6 is formed in the region of each corrugation or expansion groove 7 with an axially extending cutout in the cylindrical portion thereof.

It will be understood that each of the elements described above, or two or more together, may also find a useful application in other types of sleeve bearings having an inner sleeve formed from plastic material and provided with expansion grooves extending in axial direction throughout the length thereof differing from the types described above.

While the invention has been illustrated and described as embodied in a sleeve bearing for taking up radial and axial forces of a shaft turnably mounted therein and having an inner sleeve of plastic material having a cylindrical portion and a radially outwardly extending annular flange portion in one end thereof in which at least the cylindrical portion is formed with a plurality of corrugations or expansion grooves extending in axial direction through the inner sleeve and being spaced in circumferential direction from each other, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A sleeve bearing comprising, in combination, an inner sleeve of elastically deformable plastic material having an inner substantially cylindrical surface and being formed with a plurality of corrugations extending in axial direction through the length of said sleeve, spaced in circumferential direction from each other and forming axially extending expansion grooves open toward said inner surface, said corrugations having a wall thickness smaller than the remainder of said inner sleeve; an outer sleeve of elastically compressible rubber material surrounding said inner sleeve and tightly engaging the outer surface of the latter, said outer sleeve having in unstressed condition a given outer diameter; and a carrying member formed with a bore therethrough of a diameter smaller than said given diameter, said outer sleeve being received in said bore and tightly held therein in radial compressed condition.

2. A sleeve bearing for taking up radial and axial forces of a shaft turnably mounted therein and comprising, in combination, an inner sleeve of plastic material having a cylindrical portion and a radially outwardly extending annular flange portion at one end of said cylindrical portion, said cylindrical portion of said inner sleeve being formed with a plurality of corrugations extending in axial direction through the length of said cylindrical portion spaced in circumferential direction from each other and forming axially extending expansion grooves open toward the inner cylindrical surface of said cylindrical portion, said annular flange portion of said inner sleeve being formed with a plurality of cutouts respectively located in the region of said corrugations in said cylindrical portion and extending outwardly beyond the latter; an outer sleeve of rubber material having a cylindrical portion surrounding said cylindrical portion of said inner sleeve tightly engaging the outer surface of the latter and a radially outwardly extending annular flange portion abutting with an end face thereof against the corresponding face of said flange portion of said inner sleeve, said cylindrical portion of said rubber sleeve having in unstressed condition a given outer diameter; and a carrying member formed with a bore therethrough of a diameter smaller than said given diameter, said cylindrical portion of said outer sleeve being received in said bore and tightly held therein in radially compressed condition.

3. A sleeve bearing for taking up radial and axial forces of a shaft turnably mounted therein and comprising, in combination, an inner sleeve of plastic material having a cylindrical portion and a radially outwardly extending annular flange portion at one end of said cylindrical portion, said cylindrical portion of said inner sleeve being formed with a plurality of corrugations extending in axial direction through the length of said cylindrical portion spaced in circumferential direction from each other and forming axially extending expansion grooves open toward the inner cylindrical surface of said cylindrical portion, said annular flange portion of said inner sleeve being formed with a plurality of cutouts respectively located in the region of said corrugations in said cylindrical portion and each extending in substantially radial direction from the inner periphery of said flange portion toward but short of the outer periphery thereof; an outer sleeve of rubber material having a cylindrical portion surrounding said cylindrical portion of said inner sleeve tightly engaging the outer surface of the latter and a radially outwardly extending annular flange portion abutting with an end face thereof against the corresponding face of said flange portion of said inner sleeve, said cylindrical portion of said rubber sleeve having in unstressed condition a given outer diameter; and a carrying member formed with a bore therethrough of a diameter smaller than said given diameter, said cylindrical portion of said outer sleeve being received in said bore and tightly held therein in radially compressed condition.

4. A sleeve bearing for taking up radial and axial forces of a shaft turnably mounted therein and comprising, in combination, an inner sleeve of plastic material having a cylindrical portion and a radially outwardly extending annular flange portion at one end of said cylindrical portion, said cylindrical portion of said inner sleeve being formed with a plurality of corrugations extending in axial direction through the length of said cylindrical portion spaced in circumferential direction from each other and forming axially extending expansion grooves open toward the inner cylindrical surface of said cylindrical portion, said annular flange portion of said inner sleeve being formed with a plurality of cutouts respectively located in the region of said corrugations in said cylindrical portion and each extending in substantially radial direction from the inner periphery of said flange portion toward but short of the outer periphery thereof so as to leave at the outer end of each cutout a web of small width connecting the segments formed from said flange portion by said cutouts to each other, each of said webs being of substantially U-shaped configuration permitting said segments to expand and contract; an outer sleeve of rubber material having a cylindrical portion surrounding said cylindrical portion of said inner sleeve tightly engaging the outer surface of the latter and a radially outwardly extending annular flange portion abutting with an end face thereof against the corresponding face of said flange portion of said inner sleeve, said cylindrical portion of said rubber sleeve having in unstressed condition a given outer diameter; and a carrying member formed with a bore therethrough of a diameter smaller than said given diameter, said cylindrical portion of said outer sleeve being received in said bore and tightly held therein in radially compressed condition.

5. A sleeve bearing for taking up radial and axial forces of a shaft turnably mounted therein and comprising, in combination, an inner sleeve of plastic material having a cylindrical portion and a radially outwardly extending annular flange portion at one end of said cylindrical portion, said cylindrical portion of said inner sleeve being formed with a plurality of corrugations extending in axial direction through the length of said cylindrical portion spaced in circumferential direction from each other and forming axially extending expansion grooves open toward the inner cylindrical surface of said cylindrical portion, said annular flange portion of said inner sleeve being formed with a plurality of cutouts respectively located in the region of said corrugations in said cylindrical portion and each extending in substantially radial direction from the inner periphery of said flange portion toward but short of the outer periphery thereof so as to leave at the outer end of each cutout a web of small width connecting the segments formed from said flange portion by said cutouts to each other, each of said cutouts having a pair of lateral portions extending deeper in said web than a central portion of said cutout and each of said webs being formed substantially midway between said lateral portions of said cutout with a groove extending from the outer periphery thereof partly through said web so as to form webs of substantially U-shaped configuration permitting said segments to expand and contract; an outer sleeve of rubber material having a cylindrical portion surrounding said cylindrical portion of said inner sleeve tightly engaging the outer surface of the latter and a radially outwardly extending annular flange portion abutting with an end face thereof against the corresponding face of said flange portion of said inner sleeve, said cylindrical portion of said rubber sleeve having in unstressed condition a given outer diameter; and a carrying member formed with a bore therethrough of a diameter smaller than said given diameter, said cylindrical portion of said outer sleeve being received in said bore and tightly held therein in radially compressed condition.

6. A sleeve bearing comprising, in combination, an inner sleeve of elastically deformable material having an inner substantially cylindrical surface and being formed with a plurality of corrugations extending in axial direction through the length of said sleeve, spaced in circumferential direction from each other and forming axially extending expansion grooves, said corrugations having a wall thickness smaller than the remainder of said inner sleeve; an outer sleeve of elastically compressible material surrounding said inner sleeve and tightly engaging the outer surface of the latter, said outer sleeve having in unstressed condition a given outer diameter, said outer sleeve being formed with a plurality of axially extending cutouts respectively located in the region of said corrugations in said inner sleeve; and a carrying member formed with a bore therethrough of a diameter smaller than said given diameter, said outer sleeve being received in said bore and tightly held therein in radial compressed condition.

7. A sleeve bearing for taking up radial and axial forces of a shaft turnably mounted therein and comprising, in combination, an inner sleeve of plastic material having a cylindrical portion and a radially outwardly extending annular flange portion at one end of said cylindrical portion, said cylindrical portion of said inner sleeve being formed with a plurality of corrugations extending in axial direction through the length of said cylindrical portion spaced in circumferential direction from each other and forming axially extending expansion grooves open toward the inner cylindrical surface of said cylindrical portion; an outer sleeve of rubber material having a cylindrical portion surrounding said cylindrical portion of said inner sleeve tightly engaging the outer surface of the latter and a radially outwardly extending annular flange portion abutting with an end face thereof against the corresponding face of said flange portion of said inner sleeve, said cylindrical portion of said rubber sleeve having in unstressed condition a given outer diameter, said cylindrical portion of said rubber sleeve being formed with a plurality of axially extending cutouts respectively located in the region of said corrugations in said cylindrical portion of said inner sleeve; and a carrying member formed with a bore therethrough of a diameter smaller than said given diameter, said cylindrical portion of said outer sleeve being received in said bore and tightly held therein in radially compressed condition.

8. A sleeve bearing for taking up radial and axial forces of a shaft turnably mounted therein and comprising, in combination, an inner sleeve of plastic material having a cylindrical portion and a radially outwardly extending annular flange portion at one end of said cylindrical portion, said cylindrical portion of said inner sleeve being formed with a plurality of corrugations extending in axial direction through the length of said cylindrical portion spaced in circumferential direction from each other and forming axially extending expansion grooves open toward the inner cylindrical surface of said cylindrical portion; an outer sleeve of rubber material having a cylindrical portion surrounding said cylindrical portion of said inner sleeve tightly engaging the outer surface of the latter and a radially outwardly extending annular flange portion abutting with an end face thereof against the corresponding face of said flange portion of said inner sleeve, said cylindrical portion of said rubber sleeve having in unstressed condition a given outer diameter, said cylindrical portion of said rubber sleeve being formed with a plurality of cutouts extending in axial direction through said cylindrical portion and in radial direction from the inner to the outer surface thereof, said cutouts being respectively located in the region of said corrugations in said inner sleeve; and a carrying member formed with a bore therethrough of a diameter smaller than said given diameter, said cylindrical portion of said outer sleeve being received in said bore and tightly held therein in radially compressed condition.

References Cited

UNITED STATES PATENTS

| | | | |
|---|---|---|---|
| 1,879,287 | 9/1932 | Johnson | 308—238 |
| 3,130,991 | 4/1964 | Piragino. | |

FOREIGN PATENTS

| | | |
|---|---|---|
| 1,147,702 | 6/1957 | France. |
| 1,310,614 | 10/1962 | France. |
| 805,538 | 12/1958 | Great Britain. |

MARTIN P. SCHWADRON, *Primary Examiner.*

FRANK SUSKO, *Examiner.*